US012699001B2

(12) United States Patent
Wechselberger et al.

(10) Patent No.: US 12,699,001 B2
(45) Date of Patent: Aug. 4, 2026

(54) METHODS FOR PROVIDING WEIGHT ACCURACY INDICATIONS FOR SCALES, SYSTEMS, AND APPARATUS FOR THE SAME

(71) Applicant: Mettler-Toledo, LLC, Columbus, OH (US)

(72) Inventors: Eric V. Wechselberger, Powell, OH (US); Daniel Benedum, Dublin, OH (US); Jessica Ferree, Columbus, OH (US); Johnathan Kilgore, Powell, OH (US); Peter Kirigiti, Sunbury, OH (US); Santosh Nachu, Worthington, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 296 days.

(21) Appl. No.: 18/422,339

(22) Filed: Jan. 25, 2024

(65) Prior Publication Data

US 2025/0244164 A1     Jul. 31, 2025

(51) Int. Cl.
G01G 23/01 (2006.01)
G01G 19/02 (2006.01)
G01G 23/36 (2006.01)

(52) U.S. Cl.
CPC ........... G01G 19/024 (2013.01); G01G 23/01 (2013.01); G01G 23/36 (2013.01)

(58) Field of Classification Search
CPC ...... G01G 19/024; G01G 23/01; G01G 23/36; G01G 23/37
USPC .......................................................... 177/1
See application file for complete search history.

(56) References Cited

U.S. PATENT DOCUMENTS

| | | | |
|---|---|---|---|
| 6,137,066 A | 10/2000 | Wånelid | |
| 7,783,450 B2 * | 8/2010 | Hively | G01G 19/035 |
| | | | 177/136 |
| 11,402,256 B2 * | 8/2022 | Pearson | G01G 19/024 |
| 2009/0125273 A1 * | 5/2009 | Hively | G01G 19/035 |
| | | | 702/175 |
| 2011/0267200 A1 * | 11/2011 | Reynolds | G01G 19/024 |
| | | | 177/1 |
| 2021/0088375 A1 | 3/2021 | Valdemarsson et al. | |
| 2021/0231486 A1 | 7/2021 | Wechselberger et al. | |

FOREIGN PATENT DOCUMENTS

| | | |
|---|---|---|
| DE | 10114481 A1 | 9/2002 |
| EP | 3862730 B1 | 1/2023 |
| IN | 201941031898 A | 2/2021 |
| JP | 5424787 B2 | 2/2014 |
| WO | 2021/081604 A1 | 5/2021 |

* cited by examiner

*Primary Examiner* — Peter J Macchiarolo
*Assistant Examiner* — Mireille S Sadate-Moualeu
(74) *Attorney, Agent, or Firm* — Standley Law Group LLP; Jeffrey S. Standley; Adam J. Smith

(57) ABSTRACT

A method for providing weight accuracy indications for scales, such as vehicle scales, and systems are provided. A controller receives load data from a weighment from one or more sensors of the scale and determines a weight reading. The controller determines an estimated error magnitude for the weighment based on at least one of: at least a portion of the load data and additional data. The weight reading is electronically displayed at a user device along with at least one additional item based on the estimated error magnitude for the weighment.

20 Claims, 5 Drawing Sheets

114

114

114

METHODS FOR PROVIDING WEIGHT ACCURACY INDICATIONS FOR SCALES, SYSTEMS, AND APPARATUS FOR THE SAME

CROSS-REFERENCE TO RELATED APPLICATIONS

This application is filed as original and makes no priority claim.

TECHNICAL FIELD

Exemplary embodiments relate generally to apparatus, systems, and methods of providing weight accuracy indications for scales.

BACKGROUND AND SUMMARY OF THE INVENTION

Regardless of what is being weighed on a scale, the accuracy of a weighment is important to the user. In the case of scales used in commercial transactions, a scale's accuracy is typically regulated by law to ensure equity between buyers and sellers in the marketplace. For example, in many jurisdictions a commercial scale must be periodically checked by Weights & Measures officials to determine if a required accuracy is being achieved. In many weighing applications, an accuracy error can be limited by using a high-quality scale that is properly maintained and used in controlled conditions. However, heavy usage, harsh conditions and lack of calibration of any scale can deteriorate weighing accuracy. The accuracy of scales for weighing vehicles can be particularly challenging due to their large size, high weighing capacity and use in uncontrolled outdoor conditions. Users are sometimes unaware of accuracy error of their weighments until the error becomes significant. By estimating a scale's accuracy error, such as based on a scale's history and usage conditions as further described herein, a user can be provided with information regarding their weighment's accuracy and steps that can be taken to improve their weighment's accuracy before it becomes significant.

Vehicles are sometimes weighed on a static scale that requires a vehicle to come to a complete stop while fully on the scale. Vehicles may also be weighed on scales designed to weigh a vehicle while in motion (hereinafter also "WIM") so that the vehicle need not come to a complete stop, thereby improving efficiency in weighing over static scales. WIM scales are also typically shorter than a vehicle's wheelbase and weigh a vehicle by individual axle or axle groups. If a vehicle is weighed by axle or axle groups, the vehicle's gross weight is generally taken as the sum of all the individual axle or axle group weights. The smaller size of WIM scales provides a cost advantage over full length static scales.

Vehicles are typically weighed to determine the net weight of goods for a commercial transaction or for road limit enforcement. Regardless, the accuracy of the weighment is important to the user and generally a factor in their scale selection. Static vehicle scales typically provide higher levels of accuracy because all parts of a vehicle are weighed simultaneously while the vehicle is stopped. WIM vehicle scales are typically less accurate because parts of a vehicle are weighed at separate moments in time while the vehicle is in motion. Changes in a vehicle's weight distribution among the axles, such as due to shifting loads during the vehicle's motion, can create errors since all axles/axle groups are not weighed simultaneously. Dynamic forces generated by a vehicle's motion can create additional errors.

All scales are known to contain some accuracy error, but the amount of error associated with the weight value for a specific weighment is generally unknown. For example, manufactures may publish a typical accuracy error, but generally do not provide accuracy error information by individual weighments. As the degree of error may vary between weighments, such typical accuracy error values may be of little use for a specific weighment. Methods for providing weight accuracy indications for scales, such as for specific weighments, are provided, along with related systems and apparatus. Knowing how much error may be associated with an individual weight value may provide a user with information to decide on the suitability of the weight value for their application.

While the accuracy error of an individual weighment may not be known with complete precision, these disclosures explain how accuracy error may be estimated, such as based on a scale's history and usage conditions. In order to provide this estimation, a scale may gather data from sensors and/or database(s) for each weighment. Such data may include:

load data from one or more load sensors, noise in the load data (e.g., from load sensor readings), vehicle capacity information (e.g., number of axles determined from load sensor readings, other sensors or databases), environmental information during a weighment (e.g., weather conditions pulled from internet based resources or other sensors), time since last scale calibration (e.g., determined from internal log), number and/or magnitude of weighments since last calibration (e.g., based on historical scale data recorded at the database(s)), abusive or abnormal usages for the scale (e.g., based on historical scale data recorded at the database(s)), combinations thereof, or the like.

Alternatively, or additionally, and particularly for WIM scales, such data may also include:

vehicle speed data during a weighment (e.g., determined from load sensor readings or speed sensor), acceleration or deceleration of a vehicle during a weighment (e.g., determined from load sensor readings or speed sensor), shape of the dynamic weight signal waveform (e.g., determined from load sensor readings), combinations thereof, or the like.

Some or all of the aforementioned information may be used to determine an estimated error magnitude for each weighment. For example, any one or more of: the level of signal noise in the load data from the load sensor(s), the shape of the weight signal waveform from the load sensor(s), the amount of wind and/or rain during a measurement, the absolute ambient temperature during a measurement, the time since the last scale calibration, the number and/or magnitude of weighments since the last scale calibration, abusive and/or abnormal usage since the last scale calibration, absolute speed of the vehicle during a measurement(s), acceleration or deceleration of a vehicle during a measurement(s) may be positively correlated with the estimated error magnitude for the associated weighment. Alternatively, or additionally, a difference between the load measured and the vehicle weight capacity may be positively correlated with the estimated error magnitude for the associated weighment. Any or all of these parameters may be used individually or in combination. Other parameters may be utilized. These factors may be used to determine individual estimated error magnitudes, such as for each parameter utilized and then processed together (e.g., averaging, summation, etc.) to determine an overall estimated error magnitude for the weighment.

The estimated error magnitude may be electronically displayed, such as at one or more use devices. The estimated error magnitude may be determined and/or displayed in qualitative (e.g., high/medium/low confidence indication) and/or quantitative (e.g., +/−percentage) fashion. The estimated error magnitude may be displayed along with the sensed weight reading. Preferably, the estimated error magnitude is displayed along with reasons for the estimated error magnitude (e.g., heavy rain, windy conditions, speed too high, weight too close to capacity, etc.) and/or user options (e.g., accept, reject, re-weigh, request service, combinations thereof, or the like). An electronic notification may be generated where the estimated error magnitude is determined in a quantitative fashion and indicates, when applied against the sensed weight reading, a potential the actual weight reaches and/or exceeds a predetermined threshold (e.g., the vehicle capacity).

An exemplary method for providing weight accuracy indications for a scale includes: electronically receiving, at a controller from one or more sensors of a scale, load data for a weighment; electronically determining, at the controller, a weight reading for the weighment based on the load data; electronically determining, at the controller, an estimated error magnitude for the weighment; and electronically displaying, at a user device, the weight reading and a characterization of the estimated error magnitude for the weighment.

The estimated error magnitude for the weighment may be determined, at least in part, based on the load data. The estimated error magnitude for the weighment may be determined, at least in part, based on additional data.

The additional data may include weather information during the weighment comprising at least one of wind speed, precipitation rate, and temperature. The step of determining the estimated error magnitude may include positively correlating, at the controller, the wind speed, the precipitation rate, and/or temperature with the estimated error magnitude.

The additional data may include a length of time since a last calibration of the scale. The step of determining the estimated error magnitude may include positively corelating, at the controller, the length of time since the last calibration of the scale with the estimated error magnitude.

The additional data may include historical weighment information for the scale. The step of determining the estimated error magnitude may include positively corelating, at the controller, at least one of a number and magnitude of weighments in the historical weighment information for the scale with the estimated error magnitude, and a number of weighments in the historical weighment information with a magnitude above a predetermined threshold or a rate of loading above a predetermined threshold for the scale with the estimated error magnitude.

The method may include determining a weight capacity of the vehicle. The step of determining the estimated error magnitude may include determining a difference between the weight reading and the capacity for the vehicle and positively correlating the difference with the estimated error magnitude.

The method may include determining a maximum possible actual weight for the weighment by combining (e.g., adding, multiplying, taking absolute value of, some combination thereof, or the like) the estimated error magnitude, where the estimated error magnitude is displayed as a quantitively value, with the weight reading, determining, in at least one instance, that the maximum possible actual weight for the weighment exceeds the capacity for the vehicle, and generating an electronic notification for display at the user device indicating that the maximum possible actual weight for the weighment exceeds the capacity for the vehicle.

The estimated error magnitude may be displayed as at least one of: a qualitative indicator and a quantitative level.

The method may include electronically displaying, at the user device, reason(s) for the estimated error magnitude for the weighment and an option to accept or reject the weighment.

Any or all of a scale's history and usage parameters may be used individually or in combination in determining the estimated error magnitude. In exemplary embodiments, the estimated error magnitude for the weighment may be determined, at least in part, based on one or more of, including up to all of: the level of signal noise in the load data from the load sensor(s), the shape of the weight signal waveform from the load sensor(s), the amount of wind and/or rain during a measurement, the absolute ambient temperature during a measurement, the time since the last scale calibration, the number and/or magnitude of weighments since the last scale calibration, abusive and/or abnormal usage since the last scale calibration, absolute speed of the vehicle during a measurement(s), acceleration or deceleration of a vehicle during a measurement(s), and a difference between the load measured and the vehicle weight capacity. To determine the estimated error magnitude, the controller: positively corelates the wind speed, the precipitation rate, and temperature with the estimated error magnitude; positively correlates the length of time since the last calibration of the scale with the estimated error magnitude; positively correlates at least one of: a number and magnitude of weighments in the historical weighment information for the scale with the estimated error magnitude, and a number of weighments in the historical weighment information with a magnitude above a predetermined threshold or a rate of loading above a predetermined threshold for the scale with the estimated error magnitude; determines an absolute speed of the vehicle during a weigh-in-motion weighment, such as based on the load data, and positively correlates the speed with the estimated error magnitude; determines acceleration or deceleration for the vehicle during a weigh-in-motion weighment, and positively correlates acceleration or deceleration with the estimated error magnitude; determines shape of the dynamic weight signal waveform for a weigh-in-motion weighment, and positively correlate the shape of the dynamic weight signal waveform information with the estimated error magnitude; determines the level of signal noise in the load data from the load sensor(s), and positively correlate the level of load signal noise with the estimated error magnitude; determines weight capacity information for the vehicle, such as based on the load data, and positively correlates a difference between the weight reading and the weight capacity for the vehicle with the estimated error magnitude.

A scale may include a weight platform, one or more load sensors connected to the weigh platform, and a controller in electronic communication with the one or more sensors and comprising one or more electronic storage devices comprising software instructions, when executed by one or more processors of the controller, configure the controller to: receive, from the one or more load sensors, load data for a weighment; determine, at the controller, a weight reading for the weighment based on the load data; determine, at the controller, an estimated error magnitude for the weighment, such as by the previously described method; and display, at a user device, the weight reading and a characterization of the estimated error magnitude for the weighment.

The controller may receive additional data and determine the estimated error magnitude for the weighment based, at least in part, on the load data and the additional data.

Any or all of a scale's history and usage parameters may be used individually or in combination in determining the estimated error magnitude. In exemplary embodiments, the estimated error magnitude for the weighment may be determined, at least in part, based on one or more of, including up to all of: the level of signal noise in the load data from the load sensor(s), the shape of the weight signal waveform from the load sensor(s), the amount of wind and/or rain during a measurement, the absolute ambient temperature during a measurement, the time since the last scale calibration, the number and/or magnitude of weighments since the last scale calibration, abusive and/or abnormal usage since the last scale calibration, absolute speed of the vehicle during a measurement(s), acceleration or deceleration of a vehicle during a measurement(s), and a difference between the load measured and the vehicle weight capacity. To determine the estimated error magnitude, the controller: positively corelates the wind speed, the precipitation rate, and temperature with the estimated error magnitude; positively correlates the length of time since the last calibration of the scale with the estimated error magnitude; positively correlates at least one of: a number and magnitude of weighments in the historical weighment information for the scale with the estimated error magnitude, and a number of weighments in the historical weighment information with a magnitude above a predetermined threshold or a rate of loading above a predetermined threshold for the scale with the estimated error magnitude; determines an absolute speed of the vehicle during a weigh-in-motion weighment, such as based on the load data, and positively correlates the speed with the estimated error magnitude; determines acceleration or deceleration for the vehicle during a weigh-in-motion weighment, and positively correlates acceleration or deceleration with the estimated error magnitude; determines shape of the dynamic weight signal waveform for a weigh-in-motion weighment, and positively correlate the shape of the dynamic weight signal waveform information with the estimated error magnitude; determines the level of signal noise in the load data from the load sensor(s), and positively correlate the level of load signal noise with the estimated error magnitude; determines weight capacity information for the vehicle, such as based on the load data, and positively correlates a difference between the weight reading and the weight capacity for the vehicle with the estimated error magnitude.

A system for providing weight accuracy indications for a scale, said system may include a user device, a scale comprising: a weight platform; one or more load sensors connected to the weigh platform; and a controller in electronic communication with the one or more sensors and one or more user devices, said controller comprising one or more electronic storage devices comprising software instructions, when executed by one or more processors of the controller, configure the controller to: receive, from the one or more load sensors, load data for a weighment; determine, at the controller, a weight reading for the weighment based on the load data; determine, at the controller, an estimated error magnitude for the weighment, such as by the previously described method; and display, at the user device, the weight reading and the estimated error magnitude for the weighment.

The controller may be configured to receive additional data, and determine the estimated error magnitude for the weighment based, at least in part, on the load data and the additional data.

The controller may be further configured to electronically display, at the user device, at least one of: a characterization of the estimated error magnitude, reason(s) for the estimated error magnitude for the weighment, instructions for reducing error in subsequent weighments, an option to accept/reject a weighment, and/or an option to request service for the scale.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing or a specific application.

Figure 1:
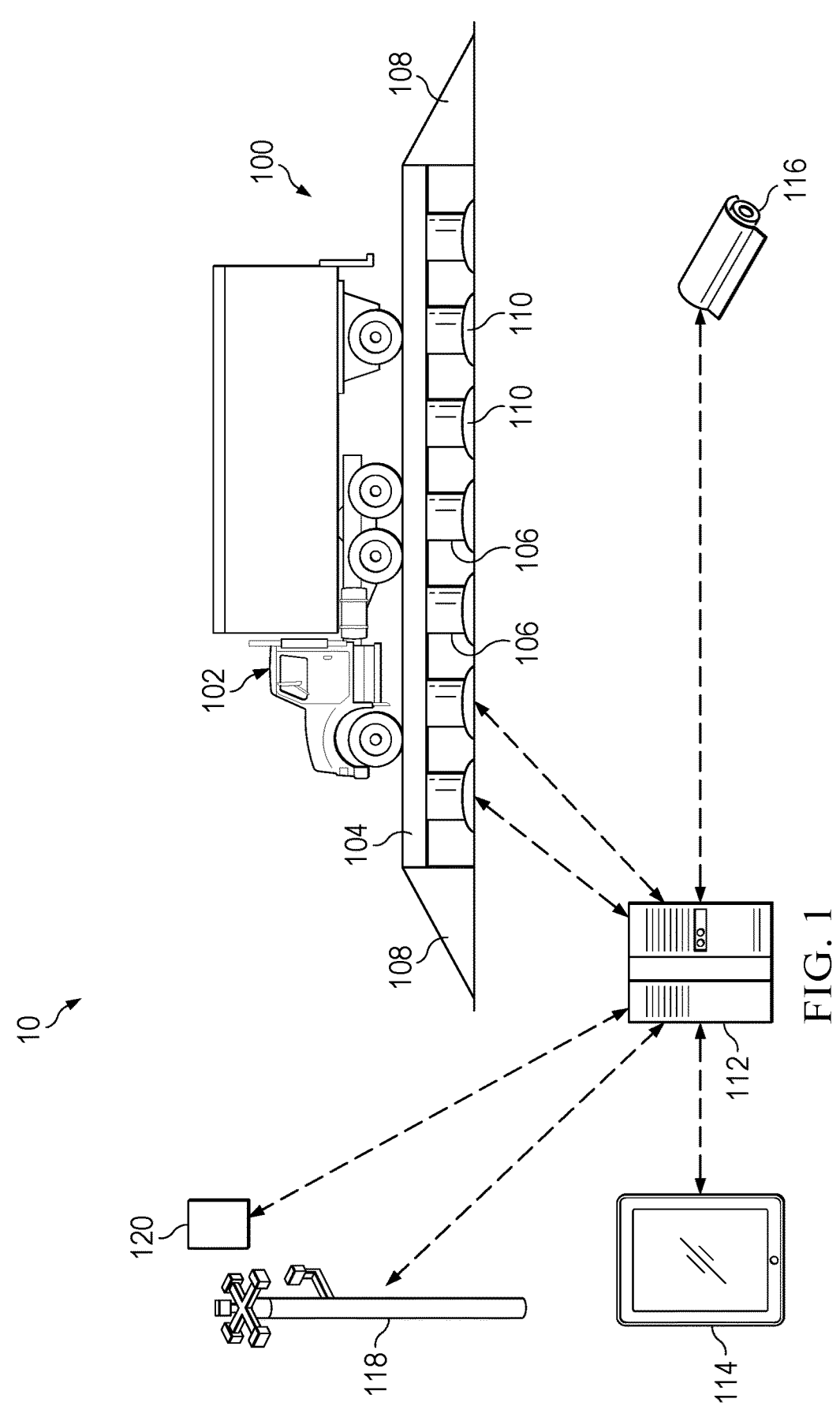
FIG. 1 is a simplified plan view of an exemplary system for providing weight accuracy indications for a scale.

FIG. 1 illustrates an exemplary system 10. The system 10 may include a weigh-in-motion or static scale 100. The scale 100 may comprise a platform 104 for a vehicle 102, such as a car, box truck, semi-truck, dump truck, cement mixer, or the like. The platform 104 may be supported by columns 106. On and/or off ramps 108 may be provided for accessing the platform 104. In other exemplary embodiments, the platform 104 may be at least substantially level with a ground surface. For example, some or all of the scale 100 may be recessed into a road, parking lot, driveway, or other ground surface, such as to be wholly or partially flush with the ground surface.

In still other exemplary embodiments, the scale 100 may be configured to accommodate a single axle or axle group of a vehicle 102. For example, instead of a single, large platform 104, a single smaller, or multiple, preferably smaller platforms 104 may be provided for a single axle, axle group or select axles or axle groups of a vehicle 102. The platform(s) 104 may be located above the ground surface or partially or wholly recessed into the ground, such as to be wholly or partially flush with the ground surface. In such embodiments, the columns 106 may not be required.

One or more load sensors 110, such as load cells, may be provided at and/or below the platform(s) 104. For example, the load sensor(s) 110 may be provided at some or all of the columns 106, where used, such as for measuring a weight of part or all of the vehicle 102. The size and shape of the platform 104 as illustrated, along with the size, shape, location, and number of columns 106 and/or load sensors 110 are exemplary and not intended to be limiting. Where the columns 106 are not utilized, the load sensor(s) 110 may be provided at the platform 104, such as at an upper and/or lower side thereof, or otherwise connected to the platform 104 and/or between the platform 104 and a ground surface. The load sensor 110 may, alternatively or additionally, comprise a strip sensor with no platform 104 or columns 106.

One or more additional sensors such as speed sensor(s) 116, environmental sensor(s) 118, vehicle identification sensor(s) 120 may be provided at scale 100. For example, speed sensor(s) 116 for determining the speed of the vehicle 102 while on scale 100, environmental sensor(s) 118 capable to measuring weather conditions at scale 100 such as wind speed, wind direction, precipitation, temperature, or the like, and or vehicle identification sensor(s) 120 for the identification of the type of vehicle 102 on scale 100.

The system 10 may include a controller 112. The controller 112 may be local to the scale 100 and/or remote therefrom and connected by way of one or more wired or wireless connections over one or more networks (e.g., intranet, internet, world wide web, cellular network, local area network, combinations thereof, or the like). The controller 112 may receive data from the load sensor(s) 110, speed sensor(s) 116, environmental sensor(s) 118, vehicle identification sensor(s) 120 or the like. The controller 112 may comprise one or more computers, electronic storage devices, processors, combinations thereof, or the like.

The controller 112 may be in electronic communication with one or more user devices 114, which may be local to the scale 100 and/or may comprise the controller 112, and/or may be remote therefrom and connected by way of any of the one or more wired or wireless connections and/or networks. The user devices 114 may comprise dedicated panels and/or interfaces, computers, electronic displays, touch screens, buttons (physical, electronic icons, etc.), tablets, laptops, servers, smartphones, vehicle 102 systems (e.g., information displays, onboard computers), combinations thereof, or the like.

The controller 112 and/or the user devices 114 may be configured to make various determinations, such as shown and/or described herein. Such determinations may be made at one or more devices. For example, certain operations may be carried out, in whole or in part, locally and others remotely. The controller 112 and/or the user devices 114 may operate locally and/or remotely (e.g., by way of one internet-based portals, hosted software applications, combinations thereof, or the like).

The controller 112 may be configured to determine an estimated error magnitude for each weighment. The controller 112 may be configured to determine and/or utilize one or more of the parameters described herein in determining the estimated error magnitude for each weighment. Some or all parameters may be considered for each weighment. The results of considering each parameter may be combined (e.g., summed or weighted average).

1. Absolute speed of the vehicle 102, preferably while on scale 100 though speed at other locations may be utilized (e.g., immediately before entering and/or exiting scale 100). The controller 112 may be configured to determine the absolute speed of the vehicle 102, such as by way of load data from the load sensor(s) 110 (e.g., distance and time between load sensor(s) 110 activation, time on/off scale 100 with scale 100 length, combinations thereof, and the like). In exemplary embodiments, without limitation, load sensor(s) 110 may act as speed sensors by tracking weight transfer between load sensor 110 positions along the length of scale 100 over time.

Alternatively, or additionally, the system 10 may comprise one or more separate speed sensors 116, such as but not limited to radar systems, laser or other optical systems, proximity detectors, motion detectors, cameras, onboard speed monitoring systems, combinations thereof, or the like. The speed sensors 116 may be used individually or collectively to determine a speed of the vehicle 102 at the scale 100. For example, the speed sensor(s) 116 may comprise a radar system for determining vehicle speed. As another example, the speed sensor(s) 116 may comprise multiple, spaced optical sensors and the time between triggering the sensors may be used to determine vehicle 102 speed. To the extent to which the speed sensor(s) 116 are separate from the load sensor(s) 110, the speed sensor(s) 116 may also be in electronic connection with the controller 112.

The controller 112 may be configured to positively correlate absolute speed with the estimated error magnitude such that the greater the absolute speed, generally, the greater the estimated error magnitude. For example, greater speeds may result in less time on the load sensors 110 and shifting weight loads of vehicle 102, which may result in weighment inaccuracies.

2. Acceleration or deceleration of the vehicle 102 while on scale 100. The controller 112 may be configured to determine speed changes of the vehicle 102 during the weighment, such as by way of changes in the absolute speed measure over time, load data from the load sensor(s) 110, and/or separate speed sensors 116.

In exemplary embodiments, without limitation, the controller 112 may be configured to determine changes in speed during the weighment, such as by comparing each instantaneous speed or a speed reading of the vehicle 102 for each tire, axle, and/or axle group measured at scale 100. The controller 112 may be configured to positively correlate speed changes and estimated error magnitude such that relatively larger changes of speed results in relatively larger estimated error magnitudes. Stated another way, the controller 112 may positively correlate acceleration (positive or negative, i.e., deceleration) with estimated error magnitude such that a greater absolute value of acceleration may result in a relatively larger estimated error magnitude. For example, changes in speed or acceleration/deceleration may tend to shift weight loads of vehicle 102 and/or generate dynamic forces, which may result in weighment inaccuracies.

3. The sensed load relative to a capacity for a type of the vehicle 102. The controller 112 may be configured to determine a sensed load, such as based on the data received from the load sensor(s) 110, and compare the sensed load to a known capacity for the vehicle 102. In exemplary embodiments, without limitation, the capacity of the vehicle 102 may be determined from the weighments data from the scale 100, such as by the number of axles sensed by the scale 100. For example, where 2 axles are sensed, the controller 112 may determine that the vehicle 102 is a box truck with a certain maximum capacity. As another example, where 5 axles are sensed, the controller 112 may determine that the vehicle 102 is a semi-truck with a different, higher maximum capacity. The number of axles may be determined based on the number of distinct weightings in a weighment such as in axle or axle group type scales 100, and/or the number of axles may be determined based on the activation of load sensors 110 in a weighment such as in the case of platform type scales 100.

Alternatively, or additionally, the capacity of the vehicle 102 may be manually entered and/or retrieved from an electronic database of known capacities for various types of vehicles based on vehicle 102 and/or vehicle type information, which may be provided by user input at the user device(s) 114 for example. Alternatively, or additionally, information regarding the vehicle 102 and/or vehicle type may be electronically determined automatically, such as based on data received from one or more vehicle identification sensors 120. The vehicle sensors 120 may comprise cameras at the scale 100 and object recognition software (e.g., sensing vehicle shape, license plate scanning), screening scales, and/or wireless electronic communication equipment at the vehicle 102 such as but not limited to over roadways vehicle sensors (e.g., automated license plate readers) and/or transponder readers, by way of non-limiting example.

The controller 112 may be configured to positively correlate the estimated error magnitude with a difference between the sensed load and the determined capacity for the type of vehicle 102 such that the lighter the load relative to the maximum load for the vehicle 102 type, the greater the estimated error magnitude. For example, relatively lightly loaded vehicles 102 may tend to bounce more (e.g., vertical movement) during measurement and/or may have weight loads more prone to shifting which may result in weighment inaccuracies, while relatively heavily load vehicles 102 tend to remain steadier and thus provide more accurate weighments.

4. A shape of the signal waveform from the WIM scale 100. The controller 112 may be configured to analyze the dynamic weight signal waveform determined from data received from the load sensor(s) 110. For platform type scales 100, by way of non-limiting example, the dynamic weight signal waveform may represent a proper waveform for dynamic weighing where the weight signal waveform increases in a series of stepwise plateaus to a maximum level as each axle of vehicle 102 enters the scale 100, a plateau at the maximum level while vehicle 102, or part thereof, is on the scale 100, which may subsequently decrease in a series of stepwise plateaus in a substantially inverse symmetrical fashion as each axle of vehicle 102 leaves scale 100. For axle or axle group type scales 100, by way of further, non-limiting example, the dynamic weight signal waveform may represent a proper waveform for dynamic weighing where the weight signal waveform comprises a series of individual plateaus each representing an individual axle or axle group. Analyzing the dynamic weight signal waveform shape comprises at least one of number and duration of plateau steps, asymmetrical waveform shape, non-conforming signal, unexpected behavior based on load data, combinations thereof, or the like.

The controller 100 may be configured to positively correlate the shape of the weight signal waveform with the estimated error magnitude such that a waveform shape with shorter plateaus or asymmetrical shape results in a greater estimated error magnitude in exemplary embodiments. For example, without limitation, an asymmetrical weight waveform shape with short plateaus may indicate unexpected driver behavior which may result in weighment inaccuracies, while a waveform shape with longer plateaus or symmetrical shape may indicate more time on scale 100 and thus provide more accurate weighments. Such waveform shapes may be determined algorithmically, such as by one or more electronically stored, computer implemented algorithms comprising parameters for detecting waveform shapes. Such algorithms may utilize machine learning techniques, such as but not limited to, neural networks.

5. The level of signal noise in the load data from the load sensor(s) 110. The controller 112 may be configured to positively correlate a noise level in the load data signal received from the load sensor(s) 110 with the estimated error magnitude. The noise level may be determined by variation in the signal, such as by square of the standard deviation though other techniques may alternatively or additionally be utilized. A relatively smooth signal may indicate minimal noise, while a relatively irregular signal may indicate increased noise levels. The controller 112 may be configured to increase the estimated error magnitude as the level of load signal noise increases. For example, increased noise may reflect outside interference which may result in weighment inaccuracies.

6. Environmental conditions during the weighment. The controller 112 may be configured to positively correlate the presence or level of certain environmental conditions during the weighment with the estimated error magnitude. Environmental conditions may be determined by electronic query to one or more environmental sensors 118, such as localized weather stations (e.g., road weather information stations), internet-based resources, integrated weather sensors, combinations thereof, or the like.

In exemplary embodiments, without limitation, the controller 112 positively correlates levels of wind, rain and/or temperature with the estimated error magnitude such that more wind, rain and/or temperature results in a higher estimated error magnitude. For example, higher wind speeds, gusts, precipitation rates, temperature outside of desirable and/or acceptable ranges (e.g., too high, too low), combinations thereof, or the like may interfere with accurate measurement, such as by load shifting and/or creating signal noise and therefore may be correlated with higher levels of estimated error magnitude. Alternatively, or additionally, presence or non-presence of weather conditions may be used such that a binary or determination is provided (e.g., rain or no rain, wind speed above X MPH or not, etc.) and provided a zero or non-zero weighting accordingly, for example. Alternatively, or additionally, weather conditions may be categorized (e.g., wind speed under X MPH, above X but below Y, above Y, etc.) and weighted accordingly, for example.

7. A length of time since a last calibration of the scale 100. The controller 112 may be configured to track and positively correlate time from a last calibration of the scale 100 with the estimated error magnitude such that the greater the time since the last calibration, the greater the estimated error magnitude. For example, scale 100 may naturally tend toward inaccuracy over time from a variety of factors (e.g., wear, aging, etc.) and require periodic recalibration. The controller 112 may rely on historical data for the scale 100 to automatically determine when the last calibration was performed. Such historical data may be stored locally and/or remotely, such as at one or more databases. For example, a user may indicate each time a calibration of the scale 100 is performed, such as by way of manual input at the user devices 114. As another example, the date of calibration may be automatically determined based on internal command logs of the controller 112 indicating various actions taken by the scale 100, such as but not necessarily limited to, calibrations. The controller 112 may maintain a running timer and/or may determine elapsed time based on a time indication (e.g., time stamp) for the last calibration. In other exemplary embodiments, without limitation, the date of last calibration may be provided, such as by user input, such that the historical data is not necessarily required. Time from calibration may be rounded, such as to a nearest day, by way of non-limiting example.

Alternatively, or additionally, the controller 112 may be configured to track and positively correlate usage of the scale 100 since other time periods or events, such as original installation of the scale 100, for example.

8. The number and/or magnitude of weighments since the last calibration. As discussed with regard to parameter number 7, a date or time of last calibration may be determined. The controller 112 may be configured to track and positively correlate usage of the scale 100 since the last calibration, with the estimated error magnitude such that the higher the usage, the greater the estimated error magnitude. Such usage may include, for example without limitation, a number of weighments, a magnitude of each such weighments, combinations therefor, or the like. Such usage information may be derived from the historical data. For example, the controller 112 may maintain an electronic record of weighments. The magnitude of such weighments may be electronically recorded, such as on an absolute basis or relative basis (e.g., one or more predetermined categories such as high, medium, low magnitude), such as based on the scale's 100 rated capacity or some other threshold. The controller 112 may utilize a weighted average of the number and magnitude of weighments, by way of non-limiting example. Where not categorized in the records, the controller 112 may, for example without limitation, categorize such weighments based on their absolute basis to provide a weighted average or other measure.

Alternatively, or additionally, the controller 112 may be configured to track and positively correlate usage of the scale 100 (e.g., number and/or magnitude of weighments) since other time periods or events, such as original installation of the scale 100, for example.

9. Abusive or abnormal usage. The controller 112 may be configured to track abusive or abnormal usage of the scale 100. Such abusive or abnormal usages may include, but are not necessarily limited to, overloads (e.g., from rated scale 100 capacity) and shock-loading events (e.g., spikes in readings from the load sensors 110 occurring faster than a predetermined threshold). Such abusive or abnormal usage may accelerate the scale's 100 natural tend toward inaccuracy over time. The controller 112 may be configured to automatically derive instances of abusive or abnormal usage from historical data and/or may keep a running record of such events. The controller 112 may be configured to positively correlate a number, frequency, and/or magnitude of such abusive or abnormal use events with the estimated error magnitude such that the greater the (presumed) resulting damage, the greater the estimated error magnitude.

Some such data (e.g., historical usage and/or calibration information) may be stored at one or more local and/or remote databases provided at or in electronic communication with the controller 112.

The factors provided herein for determining the estimated error magnitude are exemplary and not intended to be limiting. Other factors may be utilized. Some or all of the factors may be used in combination. In exemplary embodiments, without limitation, look up tables, charts, predetermined classifications, combinations thereof, or the like may be utilized to correlate weighment data, historical data, or other relevant data (e.g., changes in speed, absolute speed, etc.) with estimated error magnitude.

The estimated error magnitude determined may be provided in a quantitative fashion, qualitative fashion, or both. In exemplary embodiments, without limitation, a value (magnitude) may be determined for each factor, such as based on look up tables, charts, predetermined classifications, combinations thereof, or the like. The values/magnitude for each relevant factor (not all factors may be required for each weighment) may be numerically amalgamated, such as by summing, weighted average, averaging, combinations thereof, or the like. Optionally, weightings may be applied to some or all such factors. Alternatively, or additionally, the magnitude of the measures may serve as a weighting to various parameters. The value may provide, directly or indirectly (e.g., by association with a look up tables, charts, predetermined classifications, combinations thereof, or the like), a quantitative estimated error magnitude value.

Alternatively, or additionally, a qualitative (or quantitative) estimated error magnitude may be provided for the value(s) through a categorization process, such as based on the value for each factor, and/or the final value for the weighment. For example, a numerical rating may be determined for each factor which may be subsequently summarized, such as by summing, weighted average, averaging, or the like to arrive at a final value, which is then categorized (e.g., +/−X % error, +/−X lb error, high/medium/low error, combinations thereof, or the like). As another example, without limitation, each parameter may be categorized to arrive at a parameter value (e.g., speed of 7 mph during weighment equals a score of 2) and then summarized into a final value which is categorized (e.g., score above 10 is high, score between 5-10 is medium, score below 5 is low). Other approaches may be utilized.

Values, magnitudes, weightings, combinations thereof, or the like may be varied based on one or more factors, such as but not limited to, user preferences, type of vehicle 102, application for weighment, combinations thereof, or the like.

Calibrations or other experimental testing with controlled conditions may be performed, from time to time, to determine an accuracy of the scale 100. Results may be compared to the estimated error magnitudes to determine an accuracy of an error magnitude estimation model. The factors used, look up tables, charts, and/or predetermined classifications, weightings, combinations thereof, or the like may be updated accordingly. For example, without limitation, a vehicle 102 may be driven over the scale 100 at various absolute speeds with a known total weight. The results may be provided to the controller 112, for example, to determine if existing operations in determining estimated error magnitude based on absolute speed are acceptable. If, by way of non-limiting example, the scale 100 is particularly inaccurate at speeds over 25 mph, potentially despite re-calibrating scale, a weighting for this factor when absolute speed is 25 mph or over may be increased, such a parameters may be assigned a particular magnitude value, categorization for the parameter may be shifted, combinations thereof, or the like.

The controller 112 may perform such adjustments automatically in exemplary embodiments, without limitation, such as by employing one or more machine learning techniques (e.g., logistic regression, deep learning, cluster analysis, artificial neural network, linear regression, statistical classification, support vector machine, regression analysis, combinations thereof, or the like). Such machine learning may be performed on a collective model and/or per factor basis.

The sensors other than load sensor(s) 110 (e.g., speed sensor(s) 116, environmental sensor(s) 118, vehicle identification sensor(s) 120) may sometimes be referred to herein, individually or collectively, as additional sensor(s). Data used for the parameters other than weight data from the load sensor(s) 110 for a present weighment (e.g., vehicle identification and/or capacity, time since last calibration, historical weighment information) may sometimes be referred to herein, individually or collectively, as additional data.

Figure 2:
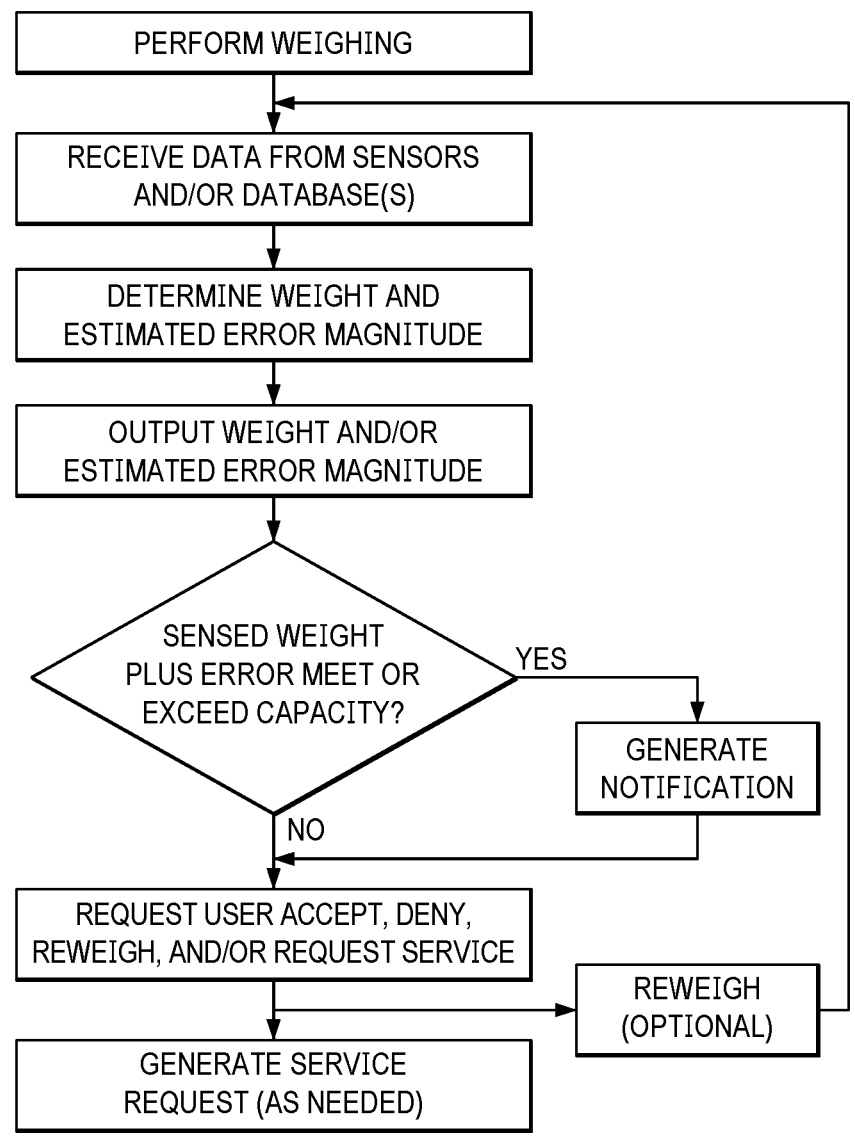
FIG. 2 is a flow chart with exemplary logic for operating the system of FIG. 1.
Figure 3:
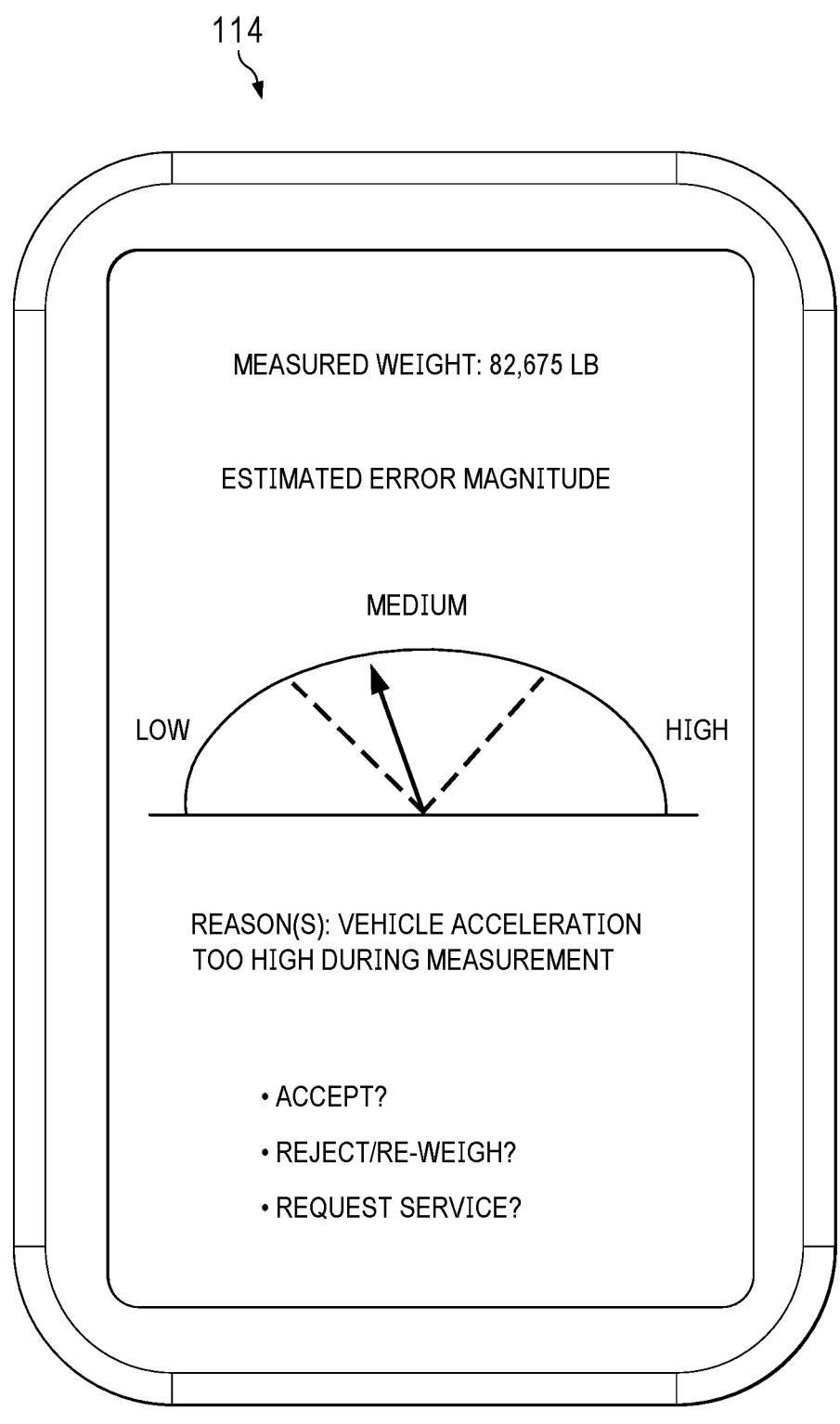
FIG. 3 is an exemplary user output display for the system of FIG. 1 and/or method of FIG. 2.

As illustrated in FIG. 2 and FIG. 3, the controller 112 may be configured to output the estimated error magnitude, such as for each weighment. The estimated error magnitude may be provided along with the sensed weight, such as at a common display and/or interface, in exemplary embodiments. Preferably, some or all of the factors affecting the estimated error magnitude may be displayed. In exemplary embodiments, particularly large magnitude (e.g., above a predetermined threshold) factor(s) affecting the estimated error magnitude may be automatically displayed. This feedback may be beneficial to vehicle 102 operators (e.g., truck drivers) and scale operators to help them avoid operating conditions that reduce weighing accuracy.

In exemplary embodiments, the controller 112 may be configured to determine if the sensed weight combined with a determined estimated error magnitude is sufficient to reach and/or exceed a threshold. If so, the controller 112 may be configured to notify a user of the scale 100 and/or vehicle 102, such as by way of electronic notification at the user devices 114. The threshold may be the vehicle 102 capacity, a user preference, a user pre-set parameter, such as based on one or more regulations, rules, laws, combinations thereof, or the like.

The estimated error magnitude may be provided at the one or more user devices 114, by way of non-limiting example. The estimated error magnitude may be provided at one or more electronic displays and/or user interfaces. The estimated error magnitude may be determined, displayed, or otherwise provided as one or more of the following:

1. A qualitative indicator based on a graphic rating scale. For example, the confidence level in the sensed weight value may increase from low to medium to high as the parameters indicate the estimated error magnitude decreases. Alternatively, or additionally, the estimated error may increase from low to medium to high as the parameters indicate the estimated error magnitude increases. Other possibilities include, for example without limitation, a poor, fair, or good classification and/or a red, yellow, and/or green categorization. FIG. 3 illustrates an exemplary display of user device 114.

2. A quantitative indicator based on a numerical rating scale. For example, the confidence level in the weight value may increase from 0 to 100 as the measurement parameters indicate the estimated error magnitude decreases. Alternatively, or additionally, the estimated error may increase from 0 to 100 as the parameters indicate the estimated error magnitude increases.

3. A quantitative weight tolerance based on the estimated error magnitude. For example, the weight accuracy error may be +1% if the measurement parameters indicate the estimated error magnitude is relatively low and may increase to +10% if the measurement parameters indicate the estimated error magnitude is potentially relatively high.

This listing of type and/or kinds of determinations and/or output is exemplary and not intended to be limiting. Other types and/or kinds of determinations and/or output may be utilized. Some or all of the types and/or kinds of determinations and/or output may be used in combination. In exemplary embodiments, without limitation, look up tables, charts, predetermined classifications, combinations thereof, or the like may be utilized to determine the appropriate output (e.g., qualitative confidence level, etc.) based on the estimated error magnitude determined (e.g., value). The type and/or kind of the determinations and/or output may be determined based on user preference.

The controller 112 may be configured to provide the sensed weight value along with the characterization of the associated estimated error magnitude together, such as at a given display at the one or more remote device 114, for each weighment individually. Parameters leading to the estimated error magnitude may be provided, such as simultaneously or at a separate display, such as upon request for more details.

If the controller 112 determines that the weight error value is due entirely or substantially (e.g., 50%) to the length of time since the previous calibration and/or abusive or abnormal usage, the controller 112 may be configured to indicate that the scale 100 is in need of service. The controller 112 may be configured to automatically generate a service scheduling prompt. Based on user input provided at the prompt, an electronic service request may be automatically generated and sent.

In exemplary embodiments, without limitation, and preferably (but optionally) in conjunction with displaying the estimated error magnitude in the weight measurement, the controller 112 may be configured to inform the user, such as at the remote electronic device(s) 114, one or more reasons for the estimated error magnitude (e.g., speed too high, weight too close to capacity, etc.). Alternatively, or in addition, and preferably (but optionally) in conjunction with displaying the estimated error magnitude in the weight measurement and/or reasons for the estimated error magnitude, the controller 112 may be configured to provide the user with, such as at the remote electronic device(s) 114, one or more instructions for improving subsequent measurement(s). The instructions may be stored at a lookup table of or associated with the controller 112 in association with one or more respective reasons for the estimated error magnitude such that the relevant instruction(s) may be recalled for some or all reasons for the estimated error magnitude for a particular weighment. For example, without limitation, if a reason for the estimated error magnitude is determined to be vehicle speed during measurement, the instruction of "slow down" or similar may be displayed.

Alternatively, or in addition, and preferably in conjunction with displaying the estimated error magnitude in the weight measurement, a user may be prompted to select one or more of: accepting the weighing result, rejecting the weighing result, requesting a re-weighment with improved weighing parameters, and/or requesting service of the scale 100, such as from the manufacturer. Such prompts may be provided at the remote electronic device(s) 114 and results may be communicated to the controller 112 to respond appropriate (e.g., set up for re-weighing, disregard weighment, record weighment, generate electronic service request, combinations thereof, or the like).

Figure 4:
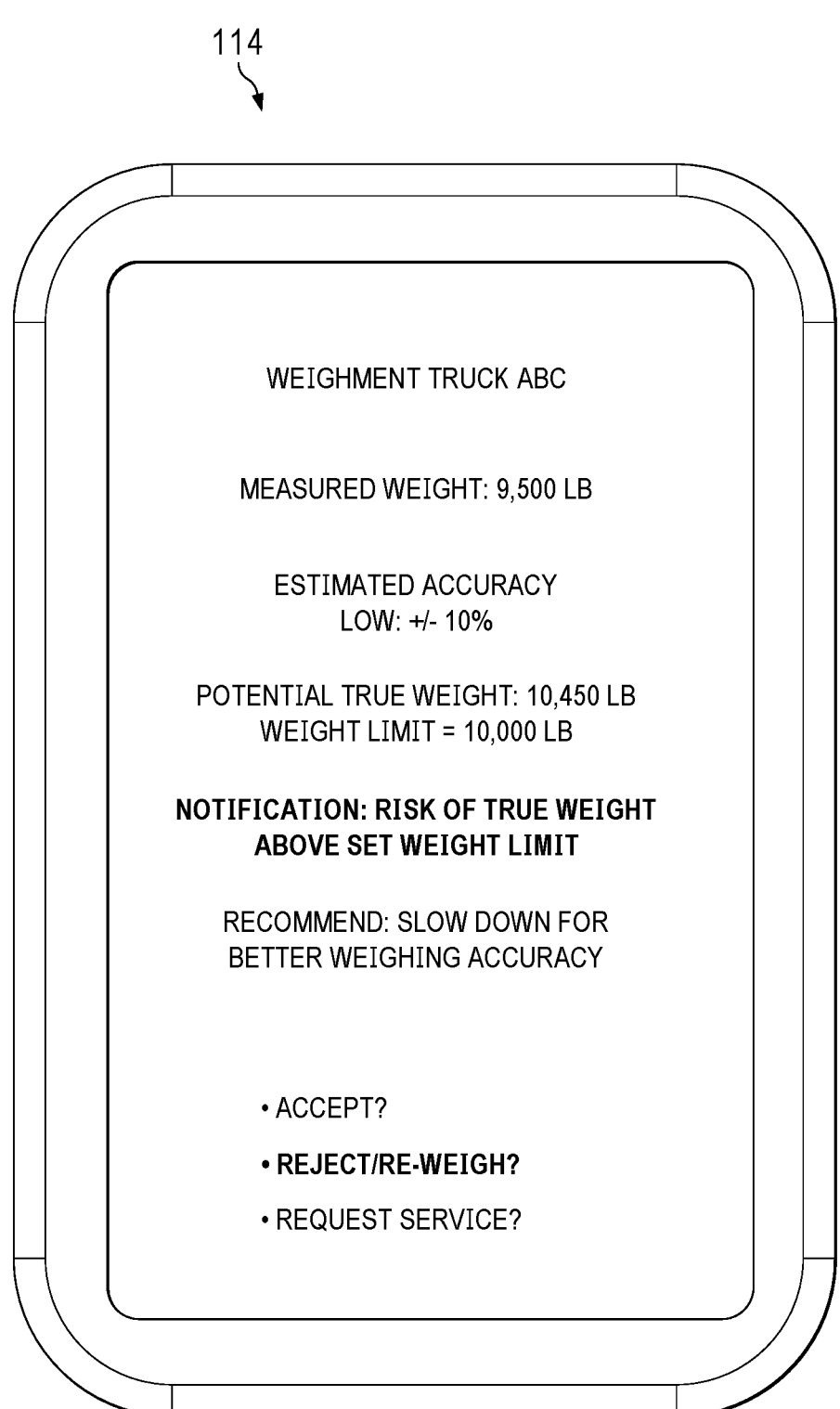
FIG. 4 is an exemplary user output display for the system of FIG. 1 and/or method of FIG. 2 with an exemplary potential overload alert.

One, of many, exemplary uses cases is provided herewith, without limitation, and illustrated in FIG. 4. In a check-weighing application, an axle weight limit of 10,000 lb has been set or otherwise determined. The measured weight of the axle is determined by the controller 112 to be 9,500 lb. The parameters related to the dynamic weight measurement indicate a "low" confidence (provided qualitatively and/or quantitively) of accuracy (which, in this example is correlated to +/−10%, by way of non-limiting example) according to the controller 112. Combining the measured weight (9,500 lb) with the estimated accuracy error (+950 lb) indicates the true axle weight may be as high as 10,450 lb. The scale 100 user is notified, such as by way of electronic notification at the associated user device 114, there is a risk that the true weight value is above the axle weight limit set for the application. Preferably, the controller 112 also determines that the largest contributing factor to the accuracy error was the vehicle 102 speed during measurement and indicates the same at the user device 114, such as for communication to the vehicle 102 operator to slow down. The user may elect, for example, to reject the weighing result and request a re-weighment with improved weighing parameters (e.g., slower speed) such as by way of the user device 114. The controller 112 may automatically discard the weight measurement and/or re-set itself for a re-weighment.

Figure 5:
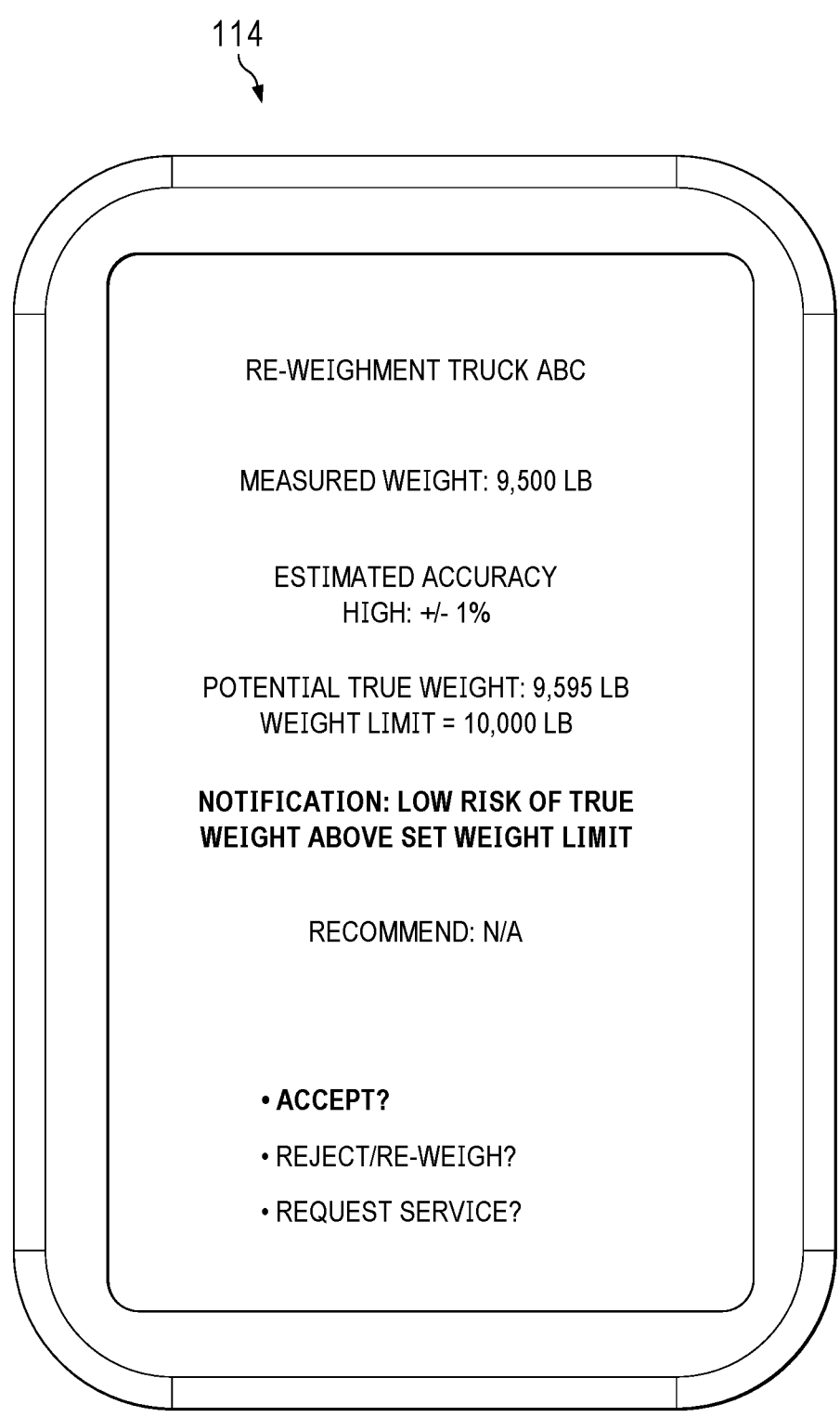
FIG. 5 is an exemplary user output display for the system of FIG. 1 and/or method of FIG. 2 with another exemplary potential overload alert.

As is further illustrated in FIG. 5, on the re-weighment, such as with the vehicle 102 operator driving more slowly, the measured weight of the axle is again 9,500 Ib. However, this time the parameters related to the dynamic weight measurement indicate a "high" confidence (provided qualitatively and/or quantitively) of accuracy (which, in this example is correlated to +/−1%, by way of non-limiting example) according to the controller 112. Combining the measured weight (9,500 lb) with the estimated accuracy error (+95 lb) indicates the true axle weight is not higher than 9,595 lb with a high confidence. The scale user is notified that there is a low risk that the true weight value is above the axle weight limit set for the application. With this information, the user decides to accept the weighing result this time, in this example.

Notably, while WIM scales 100 are shown and/or described, these disclosures may be utilized with various types and/or kinds of scales, such as static scales. Static scales would not include factors relating to speed, but factors relating to weather, calibration, and usage are still relevant. Furthermore, while weighing vehicles is shown and/or described, these disclosures may be utilized with other applications.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A method for providing weight accuracy indications for a scale, said method comprising:

electronically receiving, at a controller from one or more sensors, data that at least includes load data for a weighment at the scale;

electronically determining, at the controller, a weight reading for the weighment based on the load data;

electronically determining, at the controller, an estimated error magnitude for the weighment based on at least one of: at least a portion of the load data and additional data; and electronically displaying, at a user device, the weight reading and at least one additional item based on the estimated error magnitude for the weighment.

2. The method of claim 1 wherein:

at least some of the additional data is received from at least one of the one or more sensors.

3. The method of claim 1 wherein:

the scale comprises a weigh-in-motion scale.

4. The method of claim 1 wherein:

the at least one additional item comprises a characterization of the estimated error magnitude for the weighment.

5. The method of claim 4 wherein:

the estimated error magnitude is displayed as at least one of: a qualitative indicator and a quantitative indicator.

6. The method of claim 1 further comprising:

the at least one additional item comprises at least one reason for the estimated error magnitude for the weighment.

7. The method of claim 1 further comprising:

the at least one additional item comprises an option to accept or reject the weighment by the user.

8. The method of claim 1 wherein:

the at least one additional item comprises instructions how to reduce the estimated error magnitude of subsequent weighments.

9. The method of claim 1 wherein:

the at least one additional item comprises an option to request scale service.

10. The method of claim 1 wherein:

the additional data comprises environmental information during the weighment, said environmental information comprising at least one of wind speed, precipitation rate, and temperature;

the estimated error magnitude for the weighment is determined, at least in part, based on the environmental information; and the step of determining the estimated error magnitude comprises positively correlating, at the controller, the wind speed, precipitation rate, and temperature with the estimated error magnitude.

11. The method of claim 1 wherein:

the additional data comprises a length of time since a last calibration of the scale;

the estimated error magnitude for the weighment is determined, at least in part, based on the length of time since a last calibration of the scale; and the step of determining the estimated error magnitude comprises positively corelating, at the controller, the length of time since the last calibration of the scale with the estimated error magnitude.

12. The method of claim 1 wherein:

the additional data comprises historical weighment information for the scale;

the estimated error magnitude for the weighment is determined, at least in part, based on the historical weighment information; and the step of determining the estimated error magnitude comprises positively corelating, at the controller, at least one of:

a number and magnitude of weighments in the historical weighment information with the estimated error magnitude; and a number of weighments in the historical weighment information with a magnitude above a predetermined threshold or a rate of loading above a predetermined threshold with the estimated error magnitude.

13. The method of claim 1 further comprising:

determining a weight capacity for the vehicle; and the step of determining the estimated error magnitude comprises determining a difference between the weight reading and the weight capacity of the vehicle and positively correlating the difference with the estimated error magnitude.

14. The method of claim 1 further comprising:

determining a maximum possible actual weight for the weighment by combining the estimated error magnitude, where the estimated error magnitude is displayed as a quantitative value, with the weight reading;

determining, in at least one instance, that the maximum possible actual weight for the weighment exceeds a threshold set for the vehicle; and generating an electronic notification for display at the user device indicating that the maximum possible actual weight for the weighment exceeds a threshold set for the vehicle.

15. The method of claim 1 further comprising:

the additional data comprises the shape of the dynamic weight signal waveform for a weigh-in-motion scale;

the estimated error magnitude for the weighment is determined, at least in part, based on the shape of the dynamic weight signal waveform; and the step of determining the estimated error magnitude comprises positively corelating, at the controller, at least one of:

dynamic weight signal noise level, and duration of the dynamic weight signal, and a non-conforming dynamic weight signal shape.

16. The method of claim 1 wherein:

the estimated error magnitude for the weighment is determined, at least in part, based on one or more of, including up to all of:

environmental information during the weighment comprising at least one of wind speed, precipitation rate, and temperature;

a length of time since a last calibration of the scale; and historical weighment information for the scale;

to determine the estimated error magnitude, the controller:

positively corelates the wind speed, the precipitation rate, and the temperature with the estimated error magnitude;

positively correlates the length of time since the last calibration of the scale with the estimated error magnitude;

positively correlates at least one of:

a number and magnitude of weighments in the historical weighment information for the scale with the estimated error magnitude, and a number of weighments in the historical weighment information with a magnitude above a predetermined threshold or a rate of loading above a predetermined threshold for the scale with the estimated error magnitude;

determines an absolute speed of the vehicle during a weigh-in-motion weighment, and positively correlates the absolute speed of the vehicle with the estimated error magnitude;

determines acceleration or deceleration for the vehicle during a weigh-in-motion weighment, and positively correlates acceleration or deceleration with the estimated error magnitude;

determines shape of the dynamic weight signal waveform for a weigh-in-motion weighment, and positively correlate the shape of the dynamic weight signal waveform information with the estimated error magnitude;

determines the level of signal noise in the load data from the sensors, which include one or more load sensors, and positively correlate the level of load signal noise with the estimated error magnitude; and determines weight capacity information for the vehicle, and positively correlates a difference between the weight reading and the weight capacity of the vehicle with the estimated error magnitude.

17. The method of claim 1 wherein:

the estimated error magnitude for the weighment is electronically determined at the controller based on at least: the portion of the load data and the additional data.

18. A scale providing weight accuracy indications, said scale comprising:

a weight platform;

one or more sensors; and a controller in electronic communication with the one or more sensors and comprising one or more electronic storage devices comprising software instructions, when executed by one or more processors of the controller, configure the controller to:

receive, from the one or more sensors, load data for a weighment at the weight platform;

determine, at the controller, a weight reading for the weighment based on the load data;

determine, at the controller, an estimated error magnitude for the weighment based on at least one of: at least a portion of the load data and additional data; and display, at a user device, the weight reading and at least one additional item based on the estimated error magnitude for the weighment.

19. The scale of claim 18 wherein:

the estimated error magnitude for the weighment is determined, at least in part, based on at least one or more of, including up to all of:

environmental information during the weighment comprising at least one of wind speed, precipitation rate, and temperature, wherein the controller is configured to positively corelate the wind speed, the precipitation rate, and the temperature with the estimated error magnitude; and a length of time since a last calibration of the scale, wherein the controller is configured to positively correlate the length of time since the last calibration of the scale with the estimated error magnitude; and historical weighment information for the scale, wherein the controller is configured to positively correlate at least one of: a number and magnitude of weighments in the historical weighment information for the scale with the estimated error magnitude, and a number of weighments in the historical weighment information with a magnitude above a predetermined threshold or a rate of loading above a predetermined threshold for the scale with the estimated error magnitude; and the controller is further configured to determine, based on the sensor data, at least one of:

absolute speed of the vehicle during a weigh-in-motion weighment, wherein the controller is further configured to positively correlate the absolute speed of the vehicle with the estimated error magnitude;

acceleration or deceleration for the vehicle during a weigh-in-motion weighment, wherein the controller is further configured to positively correlate the acceleration or deceleration with the estimated error magnitude;

shape of the dynamic weight signal waveform for a weigh-in-motion weighment, wherein the controller is further configured to positively correlate the shape of the dynamic weight signal waveform information with the estimated error magnitude;

level of signal noise in the load data from the sensors, which include one or more load sensors, wherein the controller is further configured to positively correlate the level of load signal noise with the estimated error magnitude; and weight capacity information for the vehicle, wherein the controller is further configured to positively correlate a difference between the weight reading and the weight capacity of the vehicle with the estimated error magnitude.

20. The method of claim 18 wherein:

the estimated error magnitude for the weighment is electronically determined at the controller based on at least: the portion of the load data and the additional data.

* * * * *